United States Patent

[11] 3,539,169

[72] Inventors Arthur Higgs
Barrhead;
Harry Lashley, Newton Mearns; George
Roland Thompson, Glasgow, Scotland
[21] Appl. No. 705,066
[22] Filed Feb. 13, 1968
[45] Patented Nov. 10, 1970
[73] Assignee The Gas Council
London, England
a British company

[54] MELTING FURNACES
5 Claims, 2 Drawing Figs.
[52] U.S. Cl. .................................................. 266/33, 263/36
[51] Int. Cl. .................................................. C21b 11/00
[50] Field of Search ........................................ 266/33; 263/36

[56] References Cited
UNITED STATES PATENTS
| 1,092,938 | 4/1914 | Mellen | 266/33 |
| 2,209,786 | 7/1940 | McCarroll et al. | 266/33 |
| 2,243,092 | 5/1941 | Eteau | 164/193 |

Primary Examiner—J. Spencer Overholser
Assistant Examiner—R. Spencer Annear
Attorney—Mason, Fenwick & Lawrence ABSTRACT: This disclosure relates to a melting furnace for nonferrous metal including two compartments separated by a wall common to both compartments, and a passage between them beneath the common wall. The charge to be melted is passed downwardly through one compartment in counterflow to combustion products, through the passage and into the second compartment which is the combustion chamber.

Patented Nov. 10, 1970

Inventors
ARTHUR HIGGS, HARRY LASHLEY
& GEORGE ROLAND THOMPSON
By
Mason, Fenwick & Lawrence
Attorneys

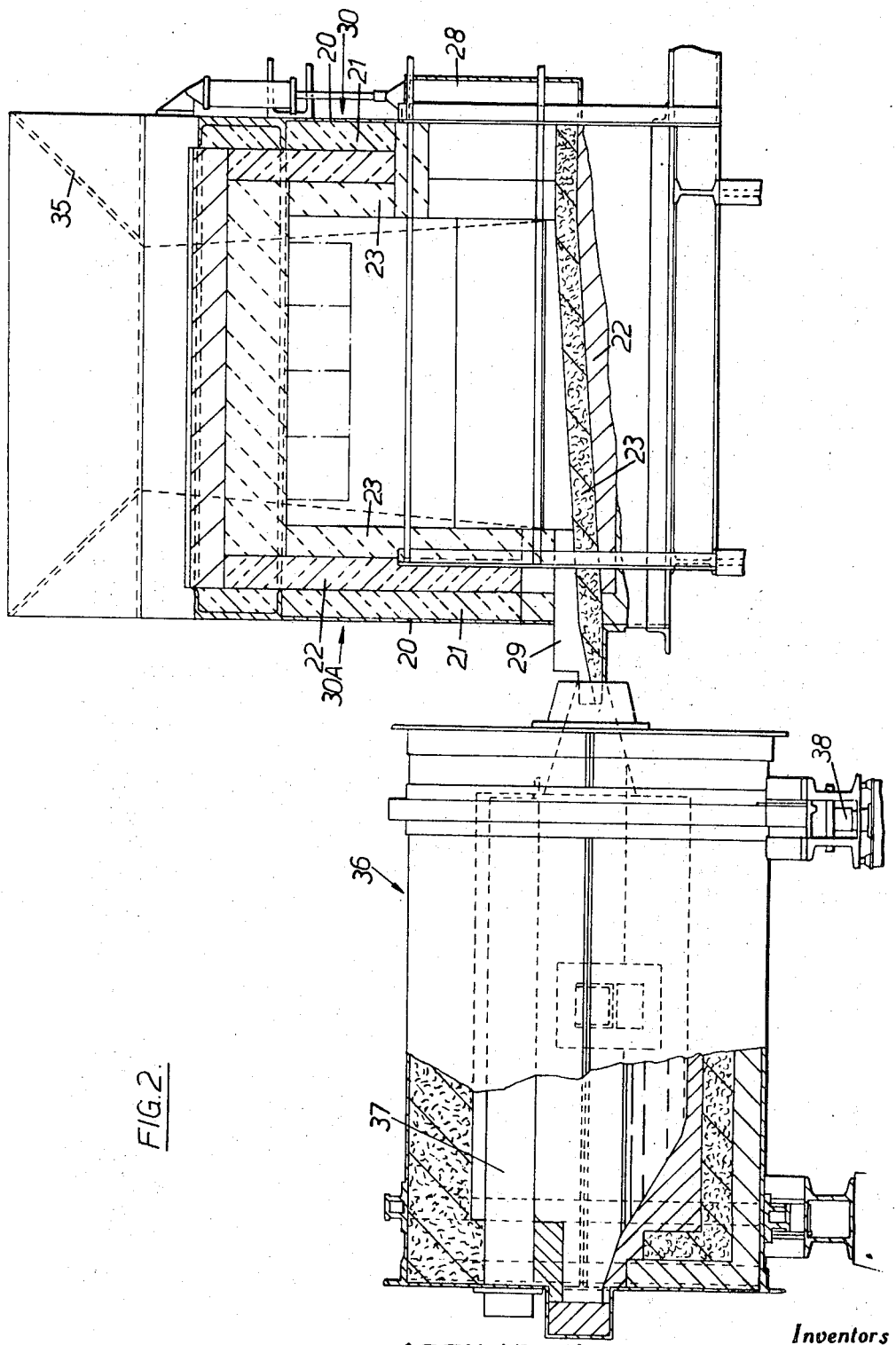

MELTING FURNACES

This invention relates to melting furnaces for nonferrous metals such, for example, as aluminum alloys.

The object of the invention is to provide a compact melting furnace of high efficiency.

According to the present invention, a melting furnace for nonferrous metal comprises a pair of side-by-side compartments having a common wall with its bottom spaced from the floor to define therewith a passage between the compartments which form respectively a tower for downward throughflow of metal and a combustion chamber from which heat passes through the common wall to the metal in the tower and from which hot gaseous combustion products flow upwards through the tower counter to the metal flow.

Preferably the combustion chamber has a roof curving downwards as a half-arch from the top of a sidewall to the common wall, and gas burning means discharge into the top of the chamber from the sidewall so that the combustion products flow in a smooth, sinuous path through the chamber, under the common wall, and upwards through the tower.

Preferably, also there is provided at the bottom of the tower a reciprocable pusher operable to force plastic metal and oxide into the combustion chamber from which the molten metal is dischargeable into a holding furnace or other receptacle.

An embodiment of the invention will now be described, by way of example, with reference to the accompanying drawings, in which:

FIG. 2 is a side view, partly in section, of a melting and holding furnace in combination.

Figure 1:
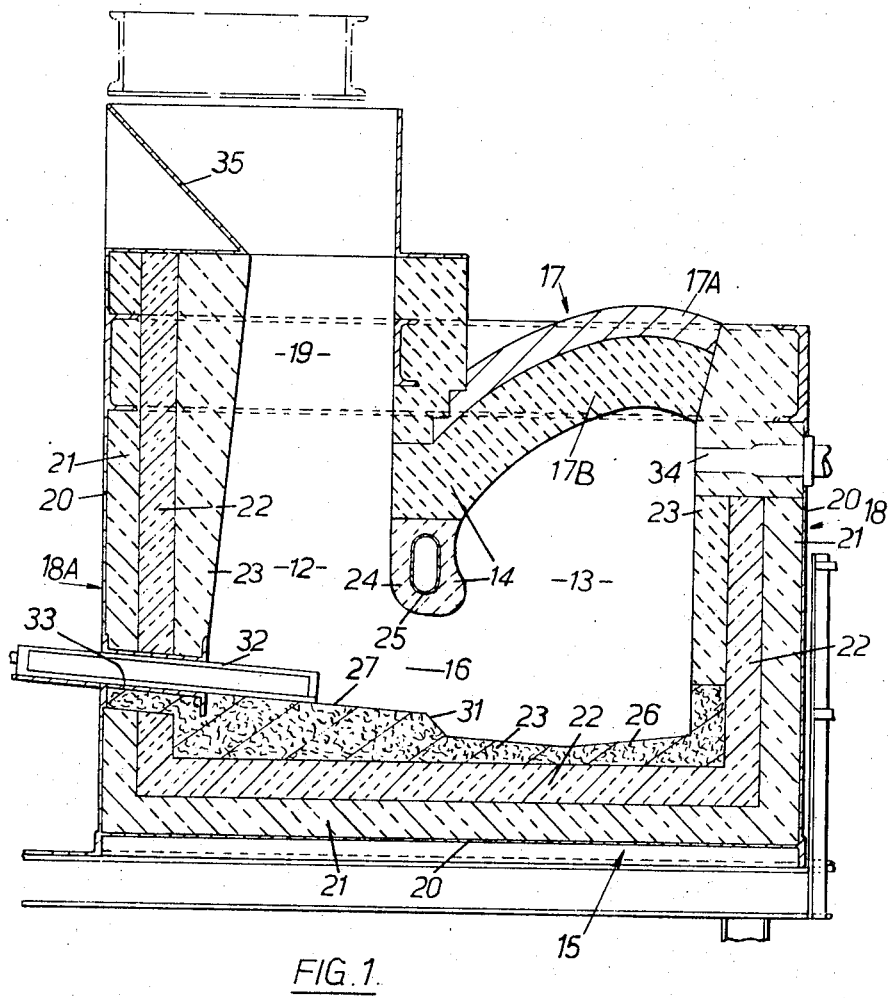
FIG. 1 is a sectional end view of a melting furnace.

A melting furnace of rectangular section in plan has side walls 18, 18A, end walls 30, 30A and a floor 15 and is divided into two side-by-side compartments 12, 13 by a common wall 14 which terminates short of the floor 15 so as to form therewith a passage 16 between the compartments 12, 13. One of the compartments 13 has a roof 17 curving downwards as a half-arch from the sidewall 18 to the common wall 14 and constitutes a combustion chamber, while the other compartment 12 extends upwards beyond the roof 17 and constitutes a downwardly divergent tower 19 for downward throughflow of metal. The side and end walls and the floor of the furnace consist of an outer metal casing 20 and a lining composed of an outer layer 21 of low thermal insulation, an intermediate layer 22 of high thermal insulation, and an inner layer 23 of refractory material. The common or dividing wall 14 is made wholly of refractory material and includes at its lower end a bullnose jack arch 24 of spall-resisting refractory material carried by the end walls and supporting the roof 17 at the junction of the roof with the common wall 14. A hollow, air-cooled heat-resistant cast beam 25 extends through the jack arch 24 to reinforce same. The arched roof 17 is composed of an outer layer 17A of high temperature thermal insulation and an inner layer 17B of firebrick. The floor portion 26 of the combustion chamber 13 is stepped below the level of the tower floor portion 27, and slopes downwards from end to end of the combustion chamber, extending from an hydraulically operable door 28 in one end wall 30 to a discharge spout 29 in the opposite end wall 30A. The tower floor portion 27 slopes laterally downwards to a step 31, and a pair of hollow, air-cooled hydraulically operable pushers 32 of heat-resisting metal extend through slots 33 in the sidewall 18A to force the plastic metal at the tower bottom through the passage 16 and into the combustion chamber 13. A series of multiple air/gas proportioning burners 34 at the top of the chamber sidewall 18 discharge horizontally into the top of the chamber 13. Metal is loaded into the tower 12 through a hopper 35 mounted on the tops of the tower walls. The furnace heat operates a thermostat which is linked electrically to a solenoid valve in the feed line (not shown) to the hydraulic pushers 32 so that the pushers only operate when the metal is plastic, and heavy thrust on the jack arch 24 due to the pushers acting on cold, nonplastic metal is avoided.

In operation of the furnace, the metal flows downwards through the tower 19, and the hot gaseous combustion products from the burners flow in a smooth, sinuous path through the chamber 13, under the common wall 14, and upwards through the tower 19 in counterflow to the metal to heat by convection and soften the metal which is also softened by heat conduction from the combustion products through the common wall 14. The plastic metal is subjected to reverberatory melting by radiation in the combustion chamber, and the molten metal is superheated in its passage down the sloping floor portion 26. The door 28 gives good access to the furnace for cleaning and observation purposes. The pushers 32 riding over the floor portion 27 of the tower are continuously operable to move slag oxide as well as plastic metal into the combustion chamber; thus the tower floor portion is kept clear and a regular flow of metal down the tower is maintained. The hot gases from the combustion chamber swirl over the plastic metal in the passage 16.

To facilitate the feeding of the metal to the hopper 35, an elevator and an hydraulic pusher-feed arrangement (not shown) for the metal are provided adjacent to the melting furnace.

A holding furnace 36 for the molten metal discharged from the melting furnace is of the rotary-barrel type and includes a radiant-heating tube 37, the waste gases of the tube being treated in a condensing system before being fed back into the holding furnace to provide a nonoxidising or neutral atmosphere. The flow of molten metal from the melting furnace to the holding furnace is controlled by providing in a support 38 for the holding furnace weight-responsive cells which operate an electrical switch controlling motorised valves in the gas and air supply lines of the melting furnace.

It will be clear that the melting furnace is of compact form and provides for quick and efficient melting of the metal.

We claim:

1. A melting furnace for nonferrous metal, comprising a pair of side-by-side compartments having a common wall terminating in a bullnosed jack arch spaced from the floor of the furnace to define therewith a passage between the compartments which form respectively a tower for downward throughflow of metal and a combustion chamber from which hot gaseous combustion products flow upwards through the tower counter to the metal flow.

2. A melting furnace as claimed in claim 1, in which the jack arch includes a hollow air cooled cast support beam.

3. A melting furnace according to claim 2, wherein the combustion chamber has a roof curving downwards as a half-arch from the top of an end wall to the common wall, and gas burning means discharge into the top of the chamber from the end wall substantially parallel to the surface of molten metal in the chamber so that the combustion products flow in a smooth, sinuous path through the chamber, under the common wall, and upwards through the tower.

4. A melting furnace according to claim 1, wherein there is provided at the bottom of the tower a reciprocable pusher operable to force plastic metal and oxide into the combustion chamber from which the molten metal is dischargeable into a holding furnace or other receptacle.

5. A melting furnace according to claim 4, in which the control means are provided to control the operation of the pushers, and thermostatic means coupled with said control are included in the furnace, the control means being operable to activate the pushers when the thermostatic means indicates that the metal at the bottom of the tower is in a plastic condition.